Patented June 10, 1952

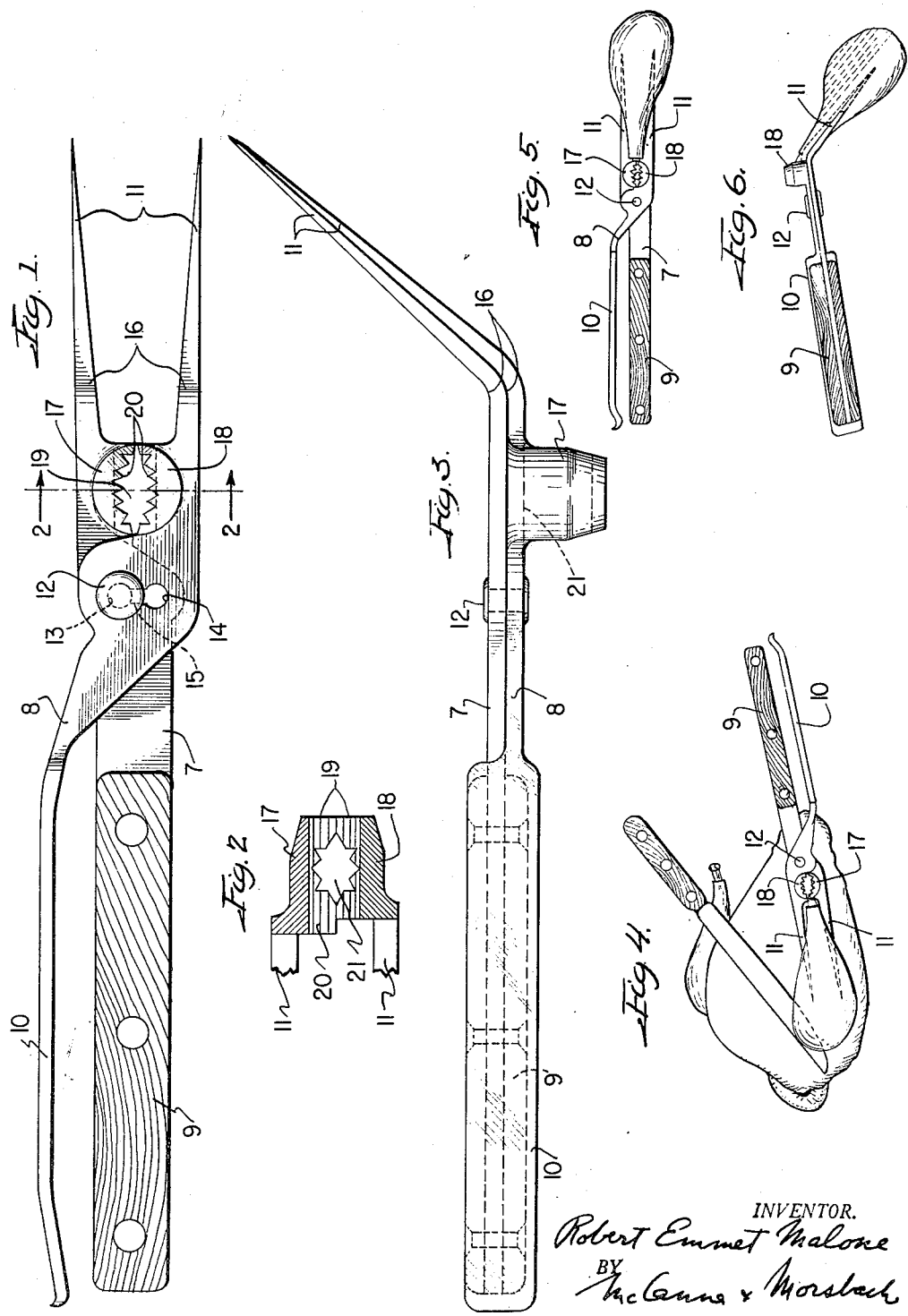

2,600,013

UNITED STATES PATENT OFFICE 2,600,013

CULINARY FORK AND GRIPPER

Robert Emmett Malone, Canton, Ohio

Application March 8, 1948, Serial No. 13,699

3 Claims. (Cl. 30—137)

This invention relates to culinary forks used when carving and serving meats, fowl, and the like.

The primary object of the present invention is to provide an improved culinary fork characterized by a novel construction which provides for a wider range of uses and for greater convenience of use than is possible with conventional constructions.

In furtherance of such object my invention contemplates the provision of a culinary fork having pivoted handle members which may be used in a pincer-like manner to operate prongs and gripper jaws. The prongs or tines differ from the ordinary fork in that they are bent laterally at a pronounced angle to the pivoted members so that they may be used in a novel manner in association with gripper jaws which are formed on the pivoted members at the base of the prongs adjacent to the pivot connection of such members. This construction provides for conjoint use of the gripper jaws and the prongs in a manner to facilitate and improve the carving and serving of meats and fowl, and it has the further advantage of permitting improved use as a serving fork and also additional uses of the gripper jaws alone for lifting hot vessels, lids, meat bones, and similar objects.

Another object of the invention is to provide a combination fork and gripper of the character described which may be economically manufactured and which will satisfactorily serve the purposes intended.

Other objects will be apparent as the invention becomes better understood by reference to the following description when considered in connection with the accompanying drawings, in which:

Figure 1 is a side view of a combination fork and gripper device embodying my invention;

Figure 2 is a sectional view taken on the section line 2—2 of Figure 1;

Figure 3 is a bottom view of the device;

Figure 4 is a schematic view showing one use of the device when cutting a leg from a roasted fowl; and Figures 5 and 6 are schematic views showing side and top applications of the device to a roasted leg when slicing or serving the leg.

My invention contemplates the provision of two members designated generally by 7 and 8, pivoted together at an intermediate point and shaped at one end to provide handles and at the opposite end to provide fork prongs and gripper jaws arranged in a novel conjoint relationship. The handles 9 and 10 may be of shape and form suitable for application of the device as a fork and also in a pincer action as when using the gripper jaws. The prongs or tines 11 are substantially identical, one on each member. The members are pivotally connected one to the other by a pin 12. Preferably a slot connection is provided for the pin 12 to permit shifting of the pin to either a narrow or a wide jaw position. To this end the pin is permanently held in the member 7 and the member 8 is provided with spaced pin openings 13 and 14 joined by a slot 15. The pin body is flat at opposite sides so that it may be shifted through the slot 15 from one position to the other.

It will now be observed that the handle portion 9 and the prong 11 of member 7 are substantially parallel but in planes in laterally offset relation when viewed from one side as in Figure 1; and the same with respect to the handle portion 10 and the prong 11 of the member 8. This locates the prongs in spaced relation when the handle portions are closed, as shown in Figure 1. It is preferred to have the prongs diverge slightly as shown in Figure 1, as is conventional in a serving fork. However, the prongs distinguish from the conventional shape in that they are bent laterally at 16, abruptly at their base, and extend laterally at an angle preferably about 45° with respect to the plane of the pivoted members when viewed from the top as shown in Figure 3. This angular relation of the prongs provides certain advantages, as will presently be apparent.

Attention is now directed to the gripping jaws 17 and 18 which are formed integral with the members 7 and 8, respectively. These jaws are located intermediate the base 16 of the prongs and the pivot portion of each member. Preferably the jaws extend laterally from the members at a common side thereof, at the side opposite from the lateral projection of the prongs, as clearly shown in Figure 3. The jaw socket 19 may be serrated on the face of the jaws as at 20 to improve their gripping properties. Also I have provided in the jaws 17—18 a second jaw socket 21 extending at right angles to the first described jaw socket and having serrated faces.

Among the advantages of my invention will be found the conjoint use of the gripper jaws and the prongs. Examples of such uses are illustrated in Figures 4, 5, and 6. In Figure 4 the fork is applied when cutting a leg from a roasted turkey or other fowl. The prongs are pierced into the body and the leg bone is gripped by the jaws with bone located in the socket 21. With one hand gripping the handles in this position the fork may be used as a pry and with the firm grip on the leg provided by the jaws the fork may be easily operated in conjunction with the cutting action of the knife which is held in the other hand to skillfully remove the leg. This feature also applies when removing a wing. It also is useful when slicing the meat from the leg. Here the prongs may be pierced along the bone and the jaws gripped on the end of the bone, as shown in Figures 5 and 6. With the leg thus securely held it may be sliced as indicated in dotted lines in Figure 8. These and other uses of the fork and gripper facilitate the cutting, handling, and serving of meats particularly when there are hot bones to handle as with a standing rib roast, pork roast, roast turkey, and the like. This is particularly advantageous when serving because the fingers do not touch the meat or the particle being served. This is sanitary and also avoids the awkward consequences of dropping the sliced piece. Aside from the many conjoint uses the culinary fork has a wide range of uses such as lifting hot lids, plates, dishes, and the like. The jaws are also adapted for gripping other objects and by adjusting the pin to the opposite center 14 the jaws have a wide grip. This wide spacing is also useful for the prongs, as when handling larger pieces. Another feature is that the angle and arrangement of the prongs with respect to the handle members afford a greater convenience than with the prongs of a conventional fork. With my invention the fork may be handled with the prongs directed laterally, thus permitting the server to work with his elbows close to the body in a more graceful and less dangerous fashion.

From the foregoing it will be apparent that my invention provides a time saving and widely useful implement for the kitchen and for serving and that the range of usefulness is by no means limited to the particular uses herein described.

It should also be apparent that changes may be made in details of construction without departing from the spirit and scope of the invention as expressed in the appended claims, in which—

I claim:

1. A culinary fork and gripper comprising a pair of pivotally connected members each having a handle at one end and an impaling prong at the opposite end, and a gripper jaw on each member at the base end of its prong, the impaling prongs extending diagonally from the same side of each member, the jaws providing a gripping socket extending transversely of said members at the side thereof opposite the side from which the impaling prongs extend diagonally.

2. A culinary fork and gripper as set forth in claim 1, in which the gripper jaws provide a first jaw socket extending crosswise of the members parallel with the pivot axis and a second jaw socket intersecting the first jaw socket, the second jaw socket extending lengthwise of its respective member and at right angles to said pivot axis.

3. A culinary fork comprising a pair of members each providing a handle at one end and an impaling prong at the other, means pivotally connecting said members together intermediate their ends on an axis transverse to said members whereby said handles are movable toward and from each other in a plane at right angles to said axis and whereby such operation of the handles moves the impaling prongs toward and from each other, each prong being bent laterally from its base at a common side of said members and shaped with its greater length in a plane at an obtuse angle with respect to said plane in which the handles are operated, and a gripper jaw on each member extending laterally therefrom at the side opposite from the side at which its prong is bent laterally, said jaws being located in juxtaposition with the prongs so as to be operable by the handles for gripping while the prongs are operated for impaling.

ROBERT EMMETT MALONE.

REFERENCES CITED

The following references are of record in the file of this patent:

UNITED STATES PATENTS

| Number | Name | Date |
| --- | --- | --- |
| 272,573 | Mihan | Feb. 20, 1883 |
| 942,549 | Cronk | Dec. 7, 1909 |
| 1,703,356 | Olson | Feb. 26, 1929 |